United States Patent [19]

Takei

[11] Patent Number: 5,595,620
[45] Date of Patent: Jan. 21, 1997

[54] APPARATUS AND METHOD FOR MANUFACTURING POLYMER DISPERSION TYPE LIQUID CRYSTAL DISPLAY DEVICE

[75] Inventor: Jiro Takei, Tama, Japan

[73] Assignee: Casio Computer Co., Ltd., Tokyo, Japan

[21] Appl. No.: 217,170

[22] Filed: Mar. 23, 1994

[30] Foreign Application Priority Data

Mar. 31, 1993 [JP] Japan ................... 5-015900 U

[51] Int. Cl.⁶ ................................................ B32B 31/00
[52] U.S. Cl. .................. 156/64; 156/80; 156/273.3; 156/273.9; 156/275.7; 156/359; 156/378; 156/379.8; 156/380.9; 156/382; 156/498
[58] Field of Search ...................... 156/379.6, 275.5, 156/379.8, 273.3, 273.9, 275.7, 64, 80, 99, 104, 145, 292, 359, 378, 380.9, 381, 382, 498

[56] References Cited

U.S. PATENT DOCUMENTS

| | | |
|---|---|---|
| 4,804,435 | 2/1989 | Gelinas et al. ............... 156/379.6 |
| 4,923,552 | 5/1990 | Fukushima et al. ............ 156/273.7 |
| 5,115,761 | 5/1992 | Hood ........................ 156/380.9 X |
| 5,173,147 | 12/1992 | Shimoyama . |
| 5,178,710 | 1/1993 | Hikmet . |
| 5,279,694 | 1/1994 | Disanto . |

FOREIGN PATENT DOCUMENTS

| | | | |
|---|---|---|---|
| 0124059 | 9/1979 | Japan . | |
| 0026075 | 2/1985 | Japan . | |
| 7404401 | 10/1975 | Netherlands ............... | 156/380.9 |
| 861080 | 9/1981 | U.S.S.R. ................... | 156/380.9 |

*Primary Examiner*—James Engel
*Assistant Examiner*—Paul M. Rivard
*Attorney, Agent, or Firm*—Frishauf, Holtz, Goodman, Langer & Chick, P.C.

[57] ABSTRACT

An apparatus for manufacturing a polymer dispersion liquid crystal layer comprises a hollow spherical light reflection member, LC cell supports provided in the reflection member, and a light source for radiating light in the reflection member. The inner surface of the reflection member constitutes a spherical reflection surface. The reflection member is provided with a light source. An LC cell filled with a mixture solution of LC and polymer material is supported on the supports. Then, the light source is turned on. Light emitted from the light source is reflected in various directions by the spherical reflection surface and is made incident uniformly on the LC cell in all directions with a substantially constant intensity. Accordingly, the light of a substantially equal intensity is radiated on all portions of the mixture solution in the LC cell, and the rate of progress of light polymerization is constant.

18 Claims, 7 Drawing Sheets

APPARATUS AND METHOD FOR MANUFACTURING POLYMER DISPERSION TYPE LIQUID CRYSTAL DISPLAY DEVICE

BACKGROUND OF THE INVENTION

1. Field of the Invention

The present invention relates generally to an apparatus and a method for manufacturing a polymer dispersion type liquid crystal display (LCD) device, and more particularly to an apparatus and a method for manufacturing a polymer dispersion type LCD device having a polymer dispersion liquid crystal (LC) layer (a composite layer of LC and high polymer resin) with a uniform internal structure.

In addition, this invention relates to an apparatus and a method for manufacturing a plurality of polymer dispersion type LCD devices having uniform characteristics.

2. Description of the Related Art

A polymer dispersion type LCD device usually comprises a liquid crystal (LC) cell formed by coupling a pair of transparent substrates having transparent electrodes with a frame-shaped sealing member interposed there between; and a polymer dispersion LC layer situated within the LC cell. The polymer dispersion LC layer comprises a composite layer of resin and LC. In general, a nematic liquid crystal having a positive dielectric anisotropy is used as LC.

LC molecules in the polymer dispersion LC layer are orientated in various directions when no voltage (electric field) is applied between mutually opposed electrodes. In this state, light incident on the polymer dispersion LC layer is scattered by a light scattering function of the polymer dispersion LC layer and, in the case of a transmission type LC element, the display is set in a dark (black) mode. When a predetermined threshold voltage or a higher voltage is applied between the mutually opposed electrodes, LC molecules are uniformly orientated in a vertical direction to the surfaces of the substrates. In this state, the light incident on the polymer dispersion LC layer is hardly affected by the light scattering function and passes through the polymer dispersion LC layer. In the case of the transmission type LC element, the display is set in a light (white) mode. As has been described, the polymer dispersion LCD device displays a desired pattern such as a character or a figure by means of transmission and scattering of light.

In general, the polymer dispersion LCD device is manufactured by the following steps. An LC cell is formed by coupling a pair of transparent substrates with a frame-shaped sealing member interposed. By means of a vacuum injection method, a mixture solution of a polymer material (monomer, oligomer, etc.), which can be subjected to a polymerization reaction by light, and a liquid crystal is filled in the LC cell.

The LC cell filled with the mixture solution is mounted on a cell support, and the LC cell is irradiated with light from above. Thus, the double bond of the polymer material, which is in the state of a monomer or an oligomer, is released, and the polymer material is separated into radicals. The polymer material is polymerized by a radial polymerization reaction in which adjacent high-molecular radicals are bonded to one another. Thus, a polymer dispersion LC layer in which LC is dispersed in a polymer resin layer is formed.

In the above manufacturing method, light is radiated on the upper surface of the LC cell to subject the polymer material in the mixture solution to light polymerization. Consequently, a polymer dispersion type LCD device having good characteristics cannot be obtained. More specifically, if light is radiated on one surface of the LC cell, the intensity of light for light-polymerizing the polymer material differs between the light radiation side (upper side) and the opposite side and the rate of light polymerization differs. As a result, the internal structure of the formed polymer dispersion LC layer, i.e. the LC dispersion state, differs between one side and the other side of the LC cell, and the electro-optical characteristics of the LCD device are degraded.

Moreover, if the polymer material is irradiated with light at the time of storage, polymerization progresses partially. To prevent this, the polymer material needs to be stored in the state in which it is perfectly shielded from light. It is difficult, however, to store the polymer material in the state in which it is perfectly shielded from light. Besides, when the polymer material and liquid crystal (LC) are mixed, or when the mixture solution is injected in the LC cell, polymerization of the polymer material may progress partially due to light leakage.

This being the case, when a polymer dispersion LC layer is formed, a variation occurs generally in characteristics of the polymer material due to a time-basis variation (a variation of molecular amount due to progress of polymerization), etc. Even if a predetermined amount of ultraviolet is radiated on the mixture solution in this state to form the polymer dispersion LC layer, the characteristics of the formed polymer dispersion LC layers differ from element to element or from lot to lot, a variance occurs in the degree of scattering of light, and the uniformity of the display characteristics of LCD devices is lost.

SUMMARY OF THE INVENTION

An object of the present invention is to provide an apparatus and method for manufacturing a polymer dispersion type liquid crystal display element having a polymer dispersion liquid crystal layer (a composite layer of liquid crystal and high polymer resin) with uniform structure.

Another object of the invention is to provide an apparatus and method for manufacturing a polymer dispersion type liquid crystal display device, which can form a polymer dispersion liquid crystal layer with uniform characteristics even if there is a variance in characteristics of polymer material due to a time-basis variation, etc.

In order to achieve the above objects, an apparatus for manufacturing a polymer dispersion type liquid crystal display device according to a first aspect of the invention comprises:

support means for supporting a liquid crystal cell filled with a mixture solution of a liquid crystal and a polymer material which is subjected to a polymerization reaction by light; and light radiation means for radiating light of a wavelength range, which causes a polymerization reaction in the polymer material, onto the liquid crystal cell supported by said support means from at least both side faces of the liquid crystal cell, preferably in all directions, and thereby forming a polymer dispersion liquid crystal layer (16) in said liquid crystal cell.

A method of manufacturing a polymer dispersion type liquid crystal display device according to the first aspect of the invention comprises:

a step of preparing a liquid crystal cell filled with a mixture solution of a liquid crystal and a polymer material which is subjected to a polymerization reaction by light; and a polymerizing step of radiating light onto the liquid crystal cell filled with the mixture solution from at least both side faces of the liquid crystal cell, polymerizing the polymer material, and forming a composite layer of the liquid crystal and a high polymer resin in said liquid crystal cell.

According to the above structure, light of relatively uniform intensity is radiated on all parts of the mixture solution, and the rate of polymerization of the polymer material is substantially constant in all parts of the mixture solution. Thus, the structure of the formed polymer dispersion liquid crystal layer, i.e. the dispersion state of liquid crystal in the high polymer resin, is substantially uniform, and the polymer dispersion type liquid crystal display device with excellent characteristics can be obtained.

In order to the above objects, an apparatus for manufacturing a polymer dispersion type liquid crystal display device according to a second aspect of the invention comprises:

temperature adjusting means for lowering the temperature of a mixture solution of a liquid crystal and a polymer material which is subjected to a polymerization reaction by light, said mixture solution being filled in a liquid crystal cell, and for phase-separating the liquid crystal and the polymer material in the mixture solution; and light radiation means (104, 106) for radiating light on the liquid crystal cell in the state in which the temperature of the mixture solution is lowered by said temperature adjusting means, and forming a polymer dispersion liquid crystal layer within said liquid crystal cell.

A method of manufacturing a polymer dispersion type liquid crystal display device according to the second aspect of the invention comprises:

a step of injecting into a liquid crystal cell a mixture solution of a liquid crystal and a polymer material which is subjected to a polymerization reaction by light;

a temperature adjusting step of lowering the temperature of the mixture solution in the liquid crystal cell and phase-separating the mixture solution; and a light radiation step of radiating light on the liquid crystal cell in the state in which the temperature of the mixture solution is lowered in said temperature adjusting step.

According to the above structure, the temperature of the mixture solution is controlled, the mixture solution is phase-separated, and the liquid crystal domains are formed. Furthermore, the degree of phase-separation and the size of domains are controlled, and the light is radiated at the time of and in the state of optimal domains. Thus, the polymer material is polymerized and the domains are fixed.

Accordingly, the polymer dispersion liquid crystal layer can be formed such that, for example, the surface area of domains, i.e. the area of interface between the liquid crystal and high polymer resin, is maximum. Specifically, the dispersion state of liquid crystal in the high polymer resin is substantially uniform, and the polymer dispersion liquid crystal display device with excellent characteristics can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Apparatus and methods for manufacturing polymer dispersion type liquid crystal display (LCD) device according to embodiments of the present invention will now be described.
(First Embodiment)

Figure 3:
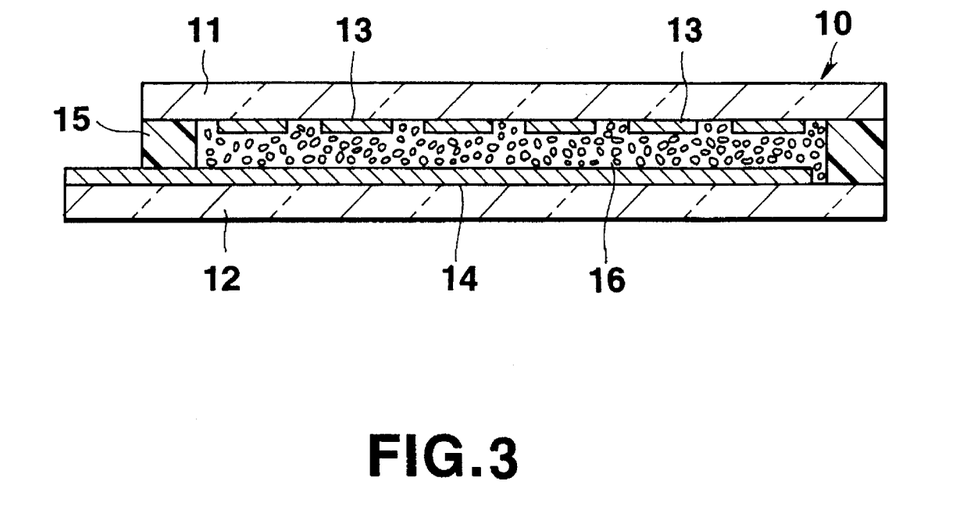
FIG. 3 is a cross-sectional view of a polymer dispersion type LCD device.

The structure of a polymer dispersion type LCD device manufactured by the manufacturing apparatus and manufacturing method according to the first embodiment will now be described. FIG. 3 is a cross-sectional view of the polymer dispersion type LCD device, and this LCD device includes an LC layer 16 in an LC cell 10.

The LC cell 10 is formed by coupling a pair of transparent substrates (e.g. glass substrates) 11 and 12 with a frame-shaped sealing member 15 interposed. The substrates 11 and 12 are provided with transparent electrodes (signal lines, operating lines, gate lines, data lines, pixel electrodes, etc.)

13 and 14 and, where necessary, active elements such as thin film transistors (TFT), etc.

Figure 4:
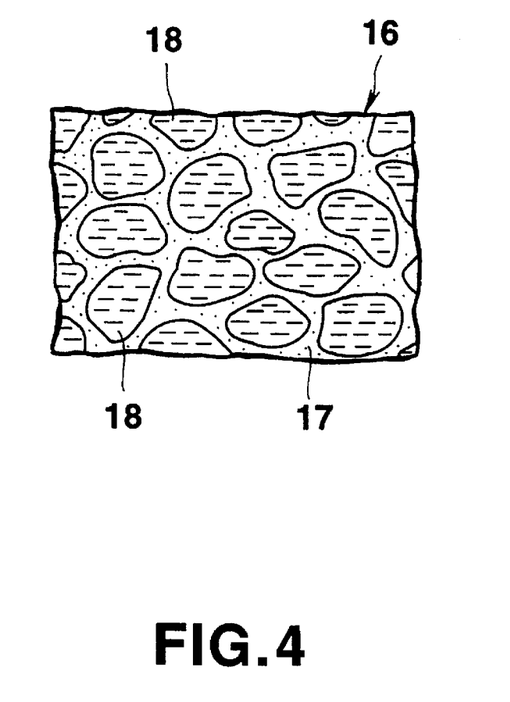
FIG. 4 is an enlarged view of a part of the polymer dispersion LC layer.

FIG. 4 is an enlarged cross-sectional view of a part of the polymer dispersion LC layer 16. The LC layer 16 has a structure in which domains 18 of liquid crystal (LC) (nematic liquid crystal of positive dielectric anisotropy) are dispersed in a transparent high polymer resin 17.

The polymer dispersion type LCD device is manufactured in the following steps.

Transparent electrodes 13 and 14 and, where necessary, active elements are provided on the paired transparent substrates 11 and 12. Then, the transparent substrate 11 and 12 are coupled with the sealing member 15 interposed, thus constituting the LC cell 10. A solution injection port is provided at a side portion of the LC cell 10. The solution injection port is formed by removing a part of the sealing member 15.

By means of a vacuum injection method, a mixture solution of a polymer material, which can be subjected to a polymerization reaction by light, and a liquid crystal is filled in the LC cell 10. A radical formation starting agent for facilitating formation of high polymer radicals is added to the mixture solution.

The injection of the mixture solution into the LC cell 10 is performed by setting the LC cell 10 and mixture solution in a vacuum chamber; evacuating the vacuum chamber to a vacuum level; immersing the solution injection port of the LC cell 10 in the mixture solution; and raising the pressure within the vacuum chamber up to an atmospheric pressure level or a level little higher than that of the atmosphere and thereby injecting the mixture solution into the LC cell 10. After the mixture solution is filled in the LC cell 10, the solution injection port is sealed.

Figure 1:
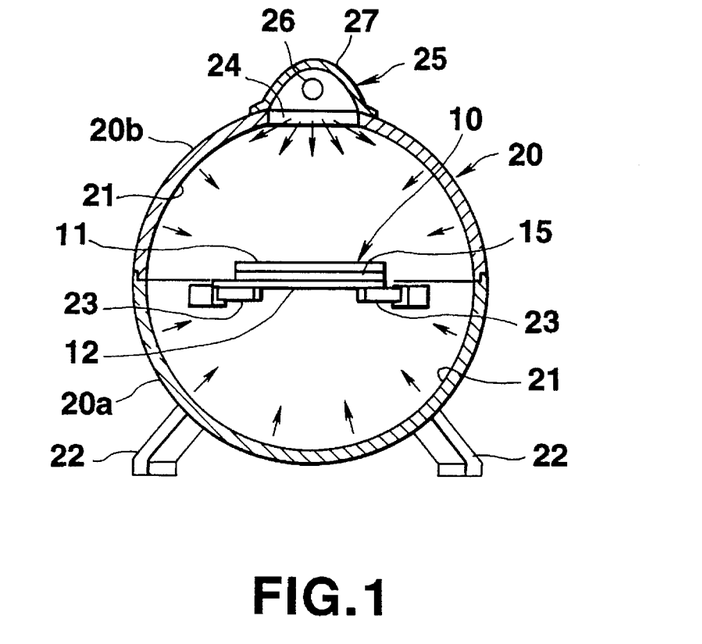
FIG. 1 is a vertical cross-sectional view of an apparatus (polymerizing apparatus) for manufacturing a polymer dispersion liquid crystal (LC) layer of a polymer dispersion liquid crystal display (LCD) device according to a first embodiment of the present invention.
Figure 2:
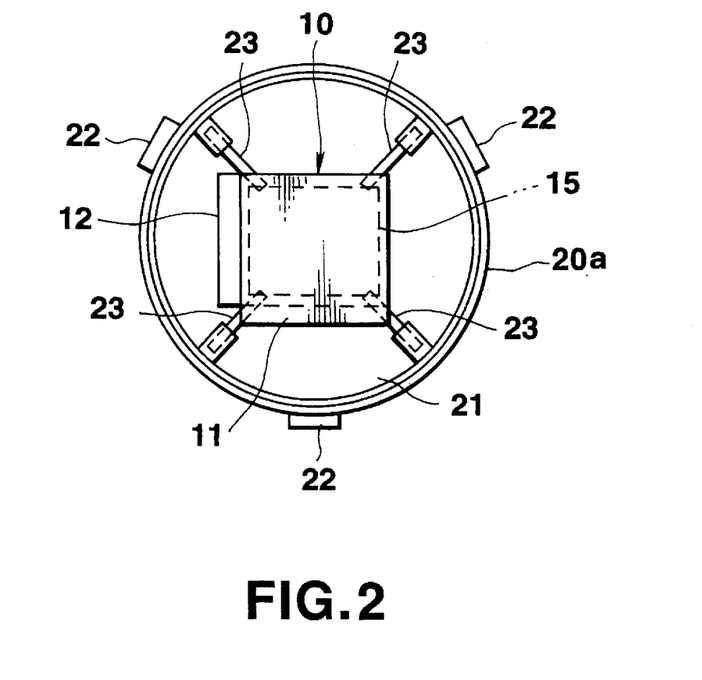
FIG. 2 is a plan view of the manufacturing apparatus shown in FIG. 1 in the state in which an upper reflection member is removed.

Thereafter, light is radiated on the LC cell 10 in all directions by a manufacturing apparatus (light polymerization apparatus) shown in FIGS. 1 and 2. Thus, the polymer material in the mixture solution filled in the LC cell 10 is subjected,to a light polymerization reaction, and a polymer dispersion LC layer is formed.

This manufacturing apparatus, as shown in FIGS. 1 and 2, comprises a hollow spherical light reflection member or chamber (hereinafter referred to as "reflection member") 20; four LC cell supports 23 provided in the reflection member 20; and a light source 25 for radiating light (ultraviolet) in the inner surface of the reflection member 20.

The inner surface of the reflection casing 20 constitutes a spherical reflection surface 21. This reflection casing 20 comprises a pair of upper and lower hemispherical surface halves 20a and 20b which are detachably combined. The hemispherical surface halves 20a and 20b are composed of metallic formed members processed to have inner mirror surfaces or synthetic resin formed members having inner surfaces coated with light reflection material.

The hemispherical surface members 20a and 20b are combined such that their circular opening edges are engaged with each other. Three support legs 22 for supporting the reflection member 20 are attached to the lower hemispherical surface member 20a.

The LC supports 23 are arranged equidistantly at four locations near the opening edge of the lower hemispherical surface member 20a. Each of the supports 23 is formed of an extendible arm. Each arm has a proximal end portion fixed to the hemispherical surface member 20a and extends horizontally towards the center of the reflection member 20.

A top portion of the reflection member 20 is provided with an opening 24 for introducing light radiated from the light source 25 into the reflection member 20. The light source 25 is situated above the opening 24.

The light source 25 comprises a light source lamp 26 for radiating ultraviolet light, and a substantially hemispherical reflector 27 receiving the light source 25 and reflecting light from the light source lamp 26. The light from the light source 25 is radiated from the opening 24 into the reflection member 20, as shown by arrows in FIG. 1.

According to this manufacturing apparatus, ultraviolet light is reflected from the inner surface of the member 20 and thus radiated in all directions on the LC cell 10 filled with the mixture solution of the polymer material and LC, and thereby the polymer material in the mixture solution is subjected to light polymerization. Thus, the polymer dispersion LC layer 16, as shown in FIGS. 3 and 4, is formed. The polymer dispersion LC layer 16 is manufactured by this manufacturing apparatus in the following manner.

The upper hemispherical surface member 20b of the reflection member 20 is removed, and the LC cell 10 filled with the mixture solution is supported on the supports 23. Each support 23 has such an adjusted length that a distal end portion thereof can support the edge or corner of the LC cell 10. The supports 23 support the end portions of the LC cell 10, as shown in FIG. 2, so as not to prevent light radiation on mixture solution-filled regions (regions surrounded by the sealing member 15) of the LC cell 10.

Then, the upper hemispherical surface member 20b is engaged with the lower hemispherical surface member 20a, so that the entire periphery of the LC cell 10 supported by the supports 23 is covered with the reflection member 20.

Thereafter, the light source lamp 26 is turned on, and thus ultraviolet light is radiated from the light source 25 into the reflection member 20. The radiated ultraviolet is reflected by the entire inner surface of the reflection member 20 and radiated on the LC cell 10. Thus, the polymer material of the mixture solution in the LC cell 10 is subjected to light polymerization.

The light from the light source 25 is reflected in various directions by the spherical reflection surface 21. Since the LC cell 10 is supported by the support members 23 so as not to prevent light radiation on the mixture solution-filled regions of the LC cell 10, the light reflected by the spherical reflection surface 21 is made incident uniformly on the LC cell 10 in all directions at substantially the same intensity.

According to the above manufacturing apparatus, light of substantially the same intensity is radiated on all portions of the mixture solution, and the rate of progress of light polymerization is constant. Accordingly, the polymer dispersion type LCD device having the polymer dispersion LC layer with uniform internal structure (uniform dispersion of LC) can be obtained.

After a predetermined amount of ultraviolet is radiated and the formation of the polymer dispersion LC layer is completed, the light source lamp 26 is turned off. The upper hemispherical surface member 20b of the reflection member 20 is removed, and the LC cell 10 is removed from the supports 23. Then, the subsequent process is initiated.

(Second Embodiment)

Figure 5:
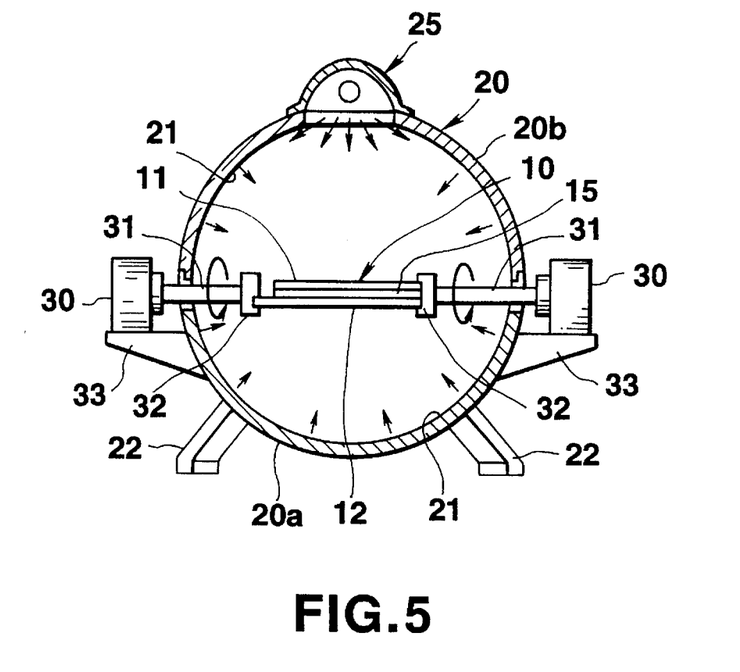
FIG. 5 is a vertical cross-sectional view of an apparatus for manufacturing a polymer dispersion LC layer of a polymer dispersion LCD device according to a second embodiment of the present invention.
Figure 6:
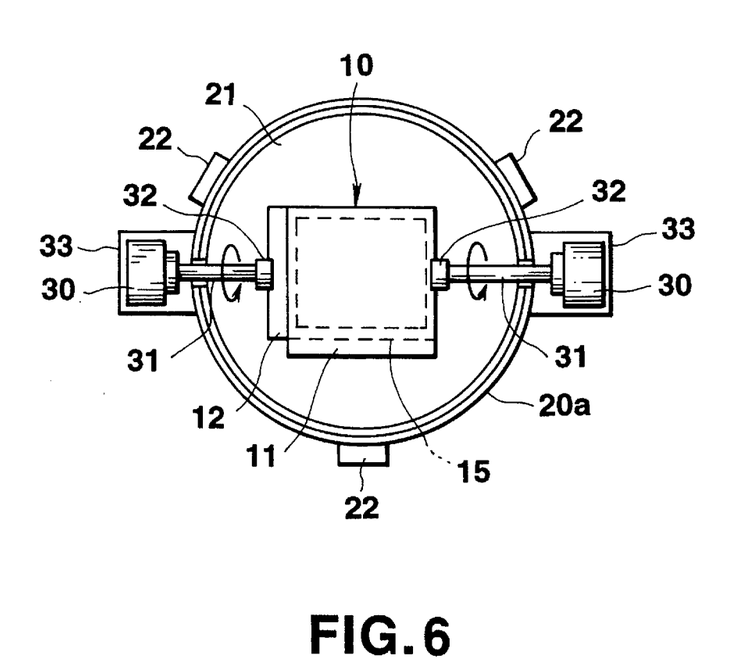
FIG. 6 is a plan view of the manufacturing apparatus shown in FIG. 5 in the state in which an upper reflection member is removed.

A second embodiment of the present invention will now be described with reference to FIGS. 5 and 6. The structural elements common-to those in FIGS. 1 and 2 are denoted by like reference numerals.

The manufacturing apparatus of the second embodiment comprises low-speed rotating devices 30 situated on both sides of the reflection member or chamber 20 and driven synchronously; rotational shafts 31 inserted horizontally in the reflection member 20; and supports 32, for removably grasping the side edges of the LC cell 10 situated at distal end portions of the rotational shafts 31, for clamping and supporting center portions of both side edges of the LC cell 10. Each of the rotating devices 30 comprises a motor with a deceleration mechanism, etc. and is slidably supported on a driver table 33. By moving the rotating devices 30 towards or away from the reflection member 20, the position of the support member 32 can be adjusted in accordance with the size of the LC cell 10. The other structural features are common to the first embodiment.

A method of forming a polymer dispersion LC layer by using the manufacturing apparatus shown in FIGS. 5 and 6 will now be described.

The upper hemispherical surface member 20b of the reflection member 20 is removed, and the LC cell 10 filled with the mixture solution is supported on the supports 32.

The upper hemispherical surface member 20b is combined with the lower hemispherical surface member 30a once again.

Then, the rotating devices 30 are driven. The light source lamp 26 is turned on, light from the light source 25 is radiated in the reflection member 20, and the mixture solution in the LC cell 10 is subjected to light polymerization. The light from the light source 25 is reflected in various directions by the spherical reflection surface 21. Subsequently, the LC cell 10 is rotated by the rotating mechanisms 30. The LC cell 10 is uniformly irradiated with ultraviolet light in all directions.

According to the above manufacturing apparatus, the polymer material can be uniformly subjected to light polymerization over the entire regions in the LC cell 10, and a polymer dispersion type LCD device having a polymer dispersion LC layer with uniform internal structure can be obtained.

After the formation of the polymer dispersion LC layer is completed, the upper hemispherical surface member 20b of the reflection member 20 is removed and the LC cell 10 is removed from the supports 32. Then, the subsequent process is initiated.

As has been described above, according to the manufacturing apparatus of the first and second embodiments, light can be uniformly radiated on the LC cell in all directions. Accordingly, the polymer material can be subjected to light polymerization at a constant rate over the entire regions in the LC cell 10, and a polymer dispersion type LCD device having good characteristics and a polymer dispersion LC layer with uniform internal structure can be obtained.
(Modification)

In the first and second embodiments, the outer configuration of the reflection housing 20 is spherical, but it may have any external shape if it has a spherical inner reflection surface. In addition, the spherical reflection surface may not have a perfect spherical shape but it may have an ellipsoidal surface or a polygonal surface. Moreover, the spherical reflection surface may be a reflection surface for scattering light.

In the first and second embodiments, the light source 25 is provided at the top of the reflection member 20, it may be situated anywhere. In the case where the light source is situated within the reflection member 20, only the light source lamp 26 may be provided, with the reflector 27 removed.

Figure 7:
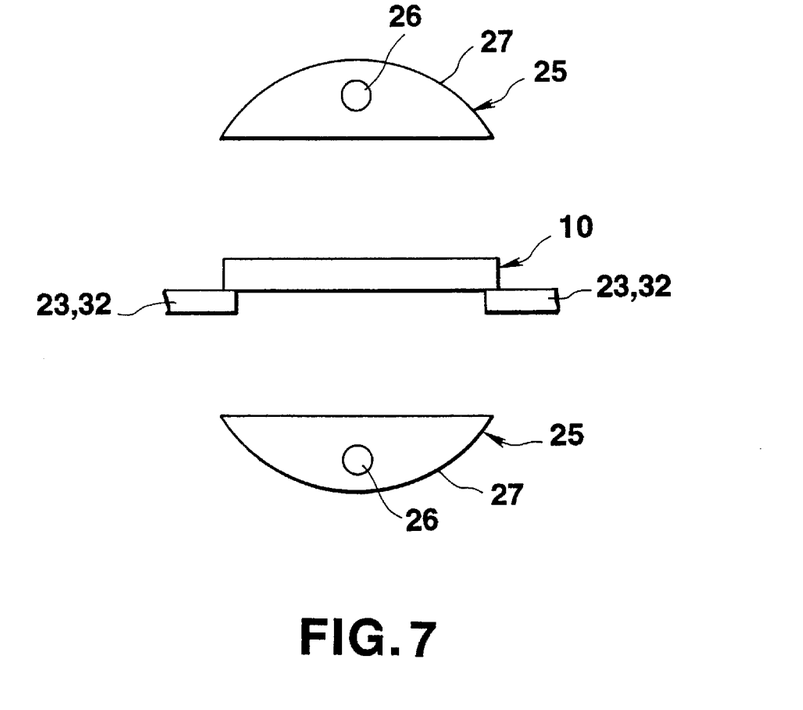
FIG. 7 is a cross-sectional view showing a modification of the manufacturing apparatus according to the first embodiment.
Figure 8:
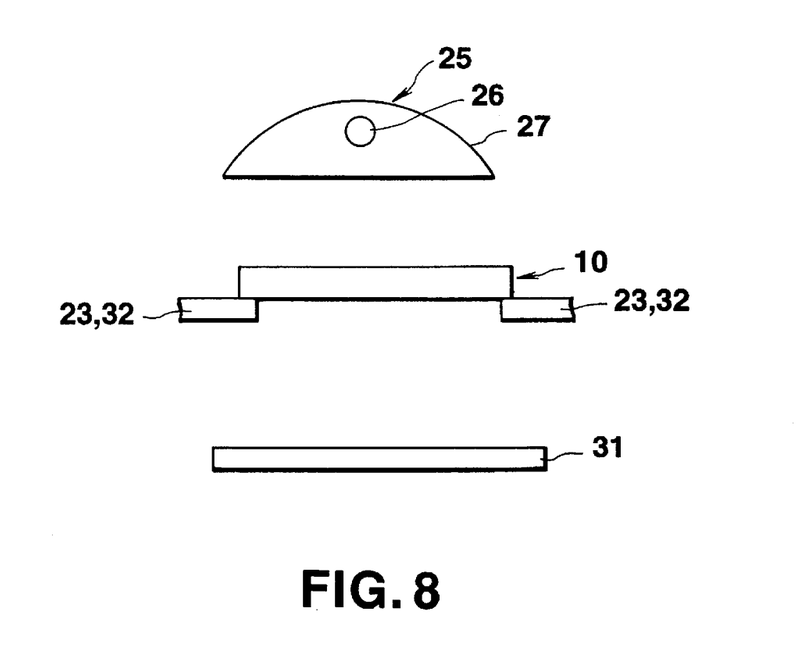
FIG. 8 is a cross-sectional view showing a modification of the manufacturing apparatus according to the second embodiment.

In the manufacturing apparatus and method according to the first and second embodiments, light is radiated on the LC cell 10 in all directions, but it may not be radiated in all directions. For example, as shown in FIG. 7, two light source lamps 26 may be situated above and below the LC cell 10 so that the upper surface and lower surface of the LC cell 10 may be irradiated with light uniformly with this structure, the same advantage can be obtained. On the other hand, as shown in FIG. 8, the light source lamp 26 may be situated above the LC cell 10 and a reflection plate 31 may be situated below the LC cell 10. With this structure, too, the same advantage can be obtained. Other structures may be adopted if ultraviolet light may be radiated substantially uniformly on at least the upper and lower surfaces of the LC cell 10.

In the first and second embodiments, the supports 23 (32) for supporting the LC cell 10 are designed to support the edge portions of the LC cell 10. However, any type of supports may be used if radiation on the mixture solution-filled regions of the LC cell 10 is not prevented. For example, the LC cell 10 may be supported by using a transparent plate which is highly permeable to ultraviolet, or other means.
(Third Embodiment)

A third embodiment of the present invention will now be described with reference to FIG. 9.

In the first and second embodiments, since ultraviolet is radiated on the LC cell in all directions, a polymer dispersion type LCD device having a polymer dispersion LC layer with uniform internal structure can be manufactured.

However, if there is a variance in characteristics (molecular amount) of the polymer material due to a time-base variation at the stage of forming the polymer dispersion LC layer, a difference occurs in degree of phase separation of LC and polymer material from element to element. Consequently, the characteristics of the polymer dispersion LC layers differ from element to element or from lot to lot, a variance occurs in the degree of scattering of light, and the uniformity of characteristics of elements is lost.

According to the third embodiment of the invention, a polymer dispersion LC layer having a uniform structure can be manufactured even in the case where there is a variance in characteristics of polymer material.

Figure 9:
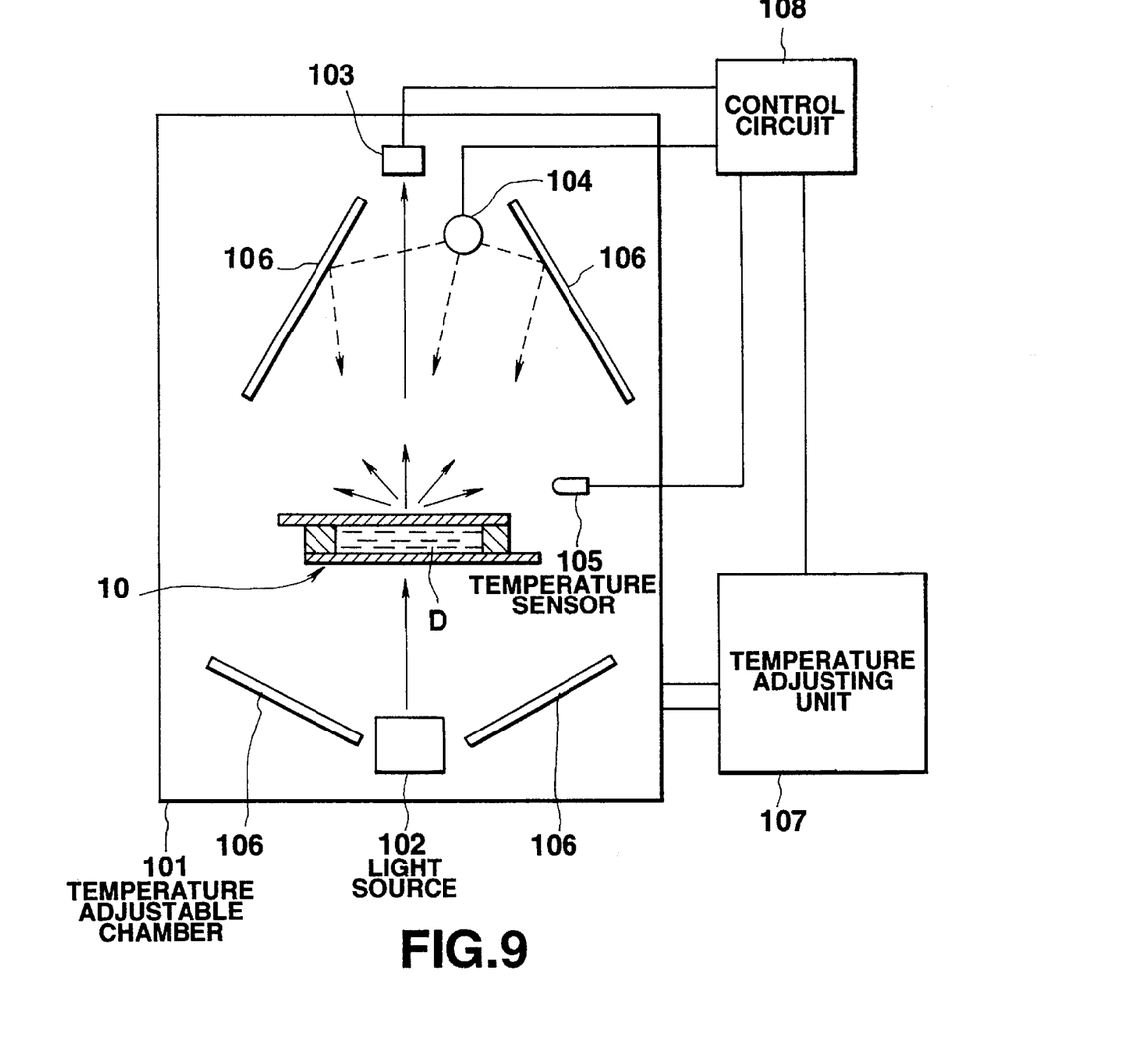
FIG. 9 is a view showing a structure of an apparatus for manufacturing a polymer dispersion LC layer of a polymer dispersion LCD device according to a third embodiment of the present invention.

FIG. 9 shows an apparatus for manufacturing a polymer dispersion type LCD device. This apparatus includes a temperature adjustable chamber 101 which is shielded from light by hermetically sealing the inside thereof. The LC cell 10 is horizontally situated at the center of the temperature adjustable chamber 101. The LC cell 10 has the same structure as in the first and second embodiments. The LC cell 10 is filled with a mixture solution D of a liquid crystal and a polymer material which is subjected to light polymerization by ultraviolet radiation. The polymer material is, e.g. an acrylic monomer or oligomer.

A light source 102 for measuring the intensity of light is provided below the LC cell 10 in the temperature adjustable chamber 101. The light source 102 radiates to the LC cell 10 light having a wavelength range which does not polymerize the polymer material, such as a He-Ne (Helium-Neon) laser beam.

A light receiving device 103 comprising a photoelectric conversion element such as a photomultiplier or a phototransistor is provided above the LC cell 10 in the temperature adjustable chamber 101. The light source 102 and light-receiving device 103 are arranged vertical to the major surface of the LC cell 10 so as to face each other.

A light source 104 for polymerization, which radiates ultraviolet light, is situated above the LC cell 10 in the temperature adjustable chamber 101. A temperature sensor 105 is provided on the side of the LC cell in the chamber 101. In addition, a plurality of reflection mirrors 106 for uniformly radiating ultraviolet light emitted from the light source 104 to the LC cell 10 are provided within the temperature adjustable chamber 101.

A temperature adjusting unit 107 is connected to the temperature adjustable chamber 101. The temperature adjusting unit 107 sends cool air into the temperature adjustable chamber 101 to gradually lower the temperature in the chamber 101 and keep the temperature in the chamber 101 at a desired constant value.

A control circuit 108 receives at proper times a signal representing the amount of light incident on the light receiving device 103 and data on the temperature in the temperature adjustable chamber 101 sensed by the temperature sensor 105. On the basis of the input, the control circuit 108 outputs a signal to the temperature adjusting unit 107 and controls the temperature adjusting unit 107. Furthermore, the control circuit 108 controls the light source 104 for polymerization.

A method for manufacturing a polymer dispersion LC layer of a polymer dispersion type LCD device by using the manufacturing apparatus shown in FIG. 9 will now be described.

The mixture solution D in which the LC and polymer material are in the compatible state is filled in the LC cell 10, and the LC cell 10 is set within the temperature adjusting chamber 101.

The control circuit 108 turns on the light source 102 to radiate light. The light which has passed through the mixture solution D is received by the light receiving device 103. The light receiving device 103 supplies to the control circuit 108 a signal corresponding to the amount of received light. Since the light emitted from the light source 102 has a wavelength range different from that of ultraviolet light, the polymer material in the mixture solution D is not polymerized.

Figure 10:
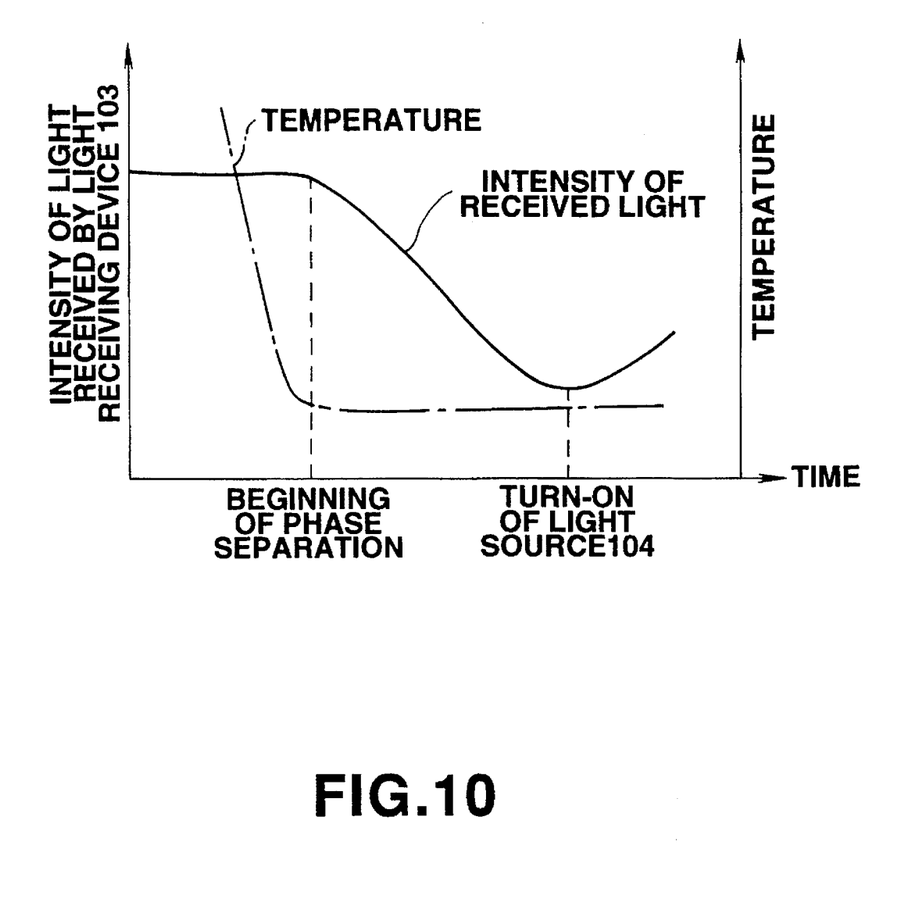
FIG. 10 is a graph showing a change of a temperature in a temperature adjustable chamber, and a change of an amount received by a light receiving apparatus, according to an operation time, and an on-timing of a polymerization light source.
Figure 11:
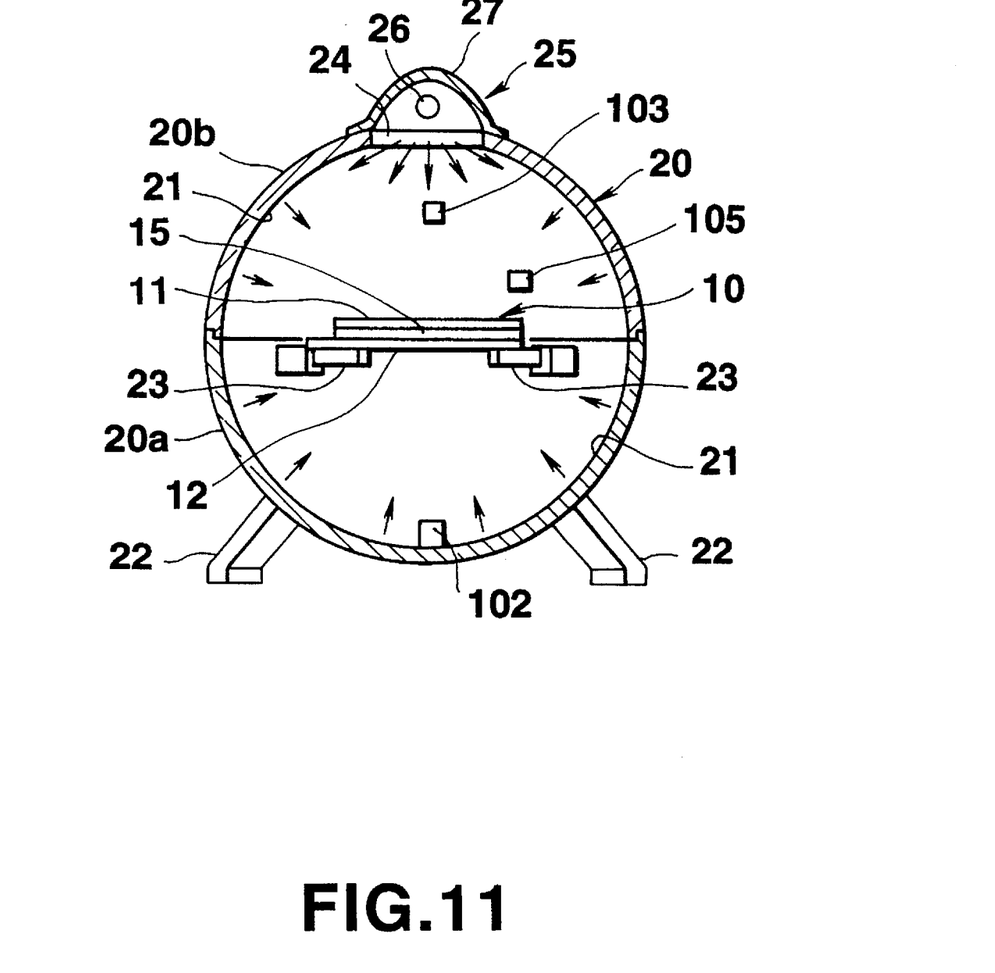
FIG. 11 is a cross-sectional view showing a modification of the apparatus for manufacturing the polymer dispersion LCD device shown in FIG. 9.

Subsequently, the control circuit 108 activates the temperature adjusting unit 107, and sets the temperature within the temperature adjustable chamber 101 at a level much lower than a temperature at which phase separation of the mixture solution D occurs (e.g. a temperature at which LC and polymer material are not melted), as shown in FIG. 10. The control circuit 108 monitors the temperature within the temperature adjustable chamber 101 by means of the sensor 105. When the temperature within the temperature adjustable chamber 101 reaches a target value, the control circuit 108 controls the temperature adjusting unit 107 and maintains that temperature.

In accordance with the drop in temperature within the temperature adjustable chamber 101, the temperature of the mixture solution D in the LC cell 10 decreases with the passage of time. Accordingly, the phase separation of the mixture solution D begins, nuclei of domains of LC will form, and the domains will grow gradually.

When the LC and polymer material are in the compatible state, the light radiated from the light source 102 onto the LC cell 10 is hardly scattered and passes through the mixture solution D. Thus, the intensity of light incident on the light receiving device 103 takes a maximum value.

If the phase separation between the LC and polymer material progresses and the diameter of the domain of the LC increases, the area of interface between the LC and polymer material increases accordingly. Since the LC and polymer have different refractive indices, the light is refracted at the interface between the LC and polymer material and is scattered. Accordingly, the intensity of light incident on the light receiving device 103 decreases gradually, as shown in FIG. 10. At the time point at which the intensity of light received by the light receiving device 103 reaches a minimum value, the area of interface between the phase-separated LC and polymer material takes substantially a maximum value and the amount of scattered light takes a maximum value.

If the signal from the light receiving device 103 indicates that the intensity of received light is maximum, the control circuit 108 turns on the light source 104, as shown in FIG. 10, and radiates ultraviolet light on the LC cell 10. The ultraviolet light is reflected by the reflection mirrors 106 and radiated on the LC cell 10 substantially uniformly in all directions.

By the ultraviolet radiation, the polymer material is polymerized with the phase separation structure wherein the area of interface between the LC and polymer material takes substantially a maximum value. Specifically, this phase separation structure is fixed, and the polymer dispersion LC layer 16 having the maximum interface area between the high polymer resin 17 and LC domain 18 is formed.

The control circuit 108 controls the emission light intensity and radiation time of the light source 104. When the amount of radiated light reaches a predetermined amount, the control circuit 108 turns off the light sources 102 and 104 and temperature adjusting unit 107. Thus, the formation of the polymer dispersion LC layer is completed.

According to the above manufacturing apparatus, the polymer material of the mixture solution D is irradiated with ultraviolet light in the state in which the mixture solution D is fully phase-separated, and the phase separation structure is fixed. Accordingly, even if there is a variance in characteristics of the polymer material due to a time-basis variation, the polymer material can be light-polymerized with the phase separation structure which can perform the best light scattering, and this phase separation structure can be fixed.

(Modification)

In the third embodiment, the temperature within the temperature adjustable chamber 101 is quickly lowered by means of the temperature adjusting device 107. However, the temperature within the temperature adjustable chamber 101, for example, may be gradually lowered in accordance with beginning and progress of phase separation of the mixture solution D (formation of nuclei of domains of liquid crystal and growth of domains). In this case, at the time point when the amount of light received by the light receiving device 103 takes a minimum value, the light source 104 is turned on and the phase separation structure at that time is fixed.

In the above modification of the third embodiment, the temperature of the mixture solution D is controlled and thereby the mixture solution D is phase-separated. However, the mixture solution may be phase-separated by both means of temperature control of the mixture solution D and ultraviolet radiation. In this case, the control circuit 108 operates., for example, in the following manner.

The control circuit 108 activates the temperature adjusting unit 107 and sets the temperature within the temperature adjustable chamber 101 at a level slightly lower than a temperature at which phase separation of the mixture solution D occurs (e.g. a temperature lower by 10° to 20° C. than a temperature at which phase separation occurs). The control circuit 108 monitors the temperature within the temperature adjustable chamber 101 by means of the sensor 105. When the temperature within the temperature adjustable chamber 101 reaches a target value, the control circuit 108 controls the temperature adjusting unit 107 and maintains that temperature.

In accordance with the drop in temperature within the temperature adjustable chamber 101, the temperature of the mixture solution D in the LC cell 10 decreases with the passage of time. Accordingly, the phase separation of the mixture solution D begins, and nuclei of domains of LC will form. Since the temperature of the mixture solution D is only slightly lower than the temperature at which the phase separation occurs, the domains of the liquid crystal remain in the state of nuclei and do not grow greatly.

In this state, the control circuit 108 turns on the light source 104 so that ultraviolet light may be radiated on the LC cell 10. By the ultraviolet radiation, the polymer material in the mixture solution D is polymerized into a polymer. The LC molecules phase-melted with the polymer material are separated from the polymer material and LC domains are formed. Thus, the domains of the LC grow with progress of polymerization.

When the amount of radiated ultraviolet light reaches a predetermined value, the control circuit 108 turns off the light sources 102 and 104 and temperature adjusting unit 107 and the manufacture of the polymer dispersion LC layer is completed.

According to this method, the nuclei of LC domains are formed by temperature control (cooling). Thus, progress of phase separation by light polymerization and growth of LC domains are started smoothly. According to this structure, neither light source 102 nor light receiving apparatus 103 is required.

In FIG. 9, the temperature adjusting chamber 101 has a rectangular shape, but it may have a spherical shape, as with the first and second embodiments. In this case, it is not necessary to provide the reflection plates 106.

The present invention is not limited to the above first to third embodiments and modifications, and various modifications may be made without departing from the spirit of the invention.

What is claimed is:

1. An apparatus for manufacturing a polymer dispersion type liquid crystal display device, said apparatus comprising:

support means for supporting a liquid crystal cell filled with a mixture solution of a liquid crystal and a polymer material which is subjected to a polymerization reaction by light; and light radiation means for radiating light of a wavelength range, which causes a polymerization reaction in the polymer material, onto the liquid crystal cell supported by said support means from at least both side faces of the liquid crystal cell, thereby forming a polymer dispersion liquid crystal layer in said liquid crystal cell;

said light radiation means comprising a casing surrounding substantially the entire periphery of the liquid crystal cell supported by said support means and having an inner reflection surface, and a light source.

2. An apparatus for manufacturing a polymer dispersion type liquid crystal display device, said apparatus comprising:

temperature adjusting means for lowering the temperature of a mixture solution of a liquid crystal and a polymer material which is subjected to a polymerization reaction by light, said mixture solution being filled in a liquid crystal cell, and for phase-separating the liquid crystal and the polymer material in the mixture solution; and light radiation means for radiating light on the liquid crystal cell in the state in which the temperature of the mixture solution is lowered by said temperature adjusting means, and forming a polymer dispersion liquid crystal layer within said liquid crystal cell.

3. The apparatus according to claim 2, wherein said temperature adjusting means lowers the temperature of the mixture solution, forms domains of the liquid crystal in the mixture solution, and grows the domains, and said light radiation means radiates light on the liquid crystal cell in the state in which the surface area of said domains is maximum, polymerizes the polymer material, and fixes the domains.

4. The apparatus according to claim 2, wherein said temperature adjusting means lowers the temperature of the mixture solution, forms domains of the liquid crystal in the mixture solution, and grows the domains, and said light radiation means radiates light on the liquid crystal cell in the state in which the degree of light scattering due to the mixture solution is maximum, polymerizes the polymer material, and fixes the domains.

5. The apparatus according to claim 2, wherein said temperature adjusting means lowers the temperature of the mixture solution, forms domains of the liquid crystal in the mixture solution, and grows the domains, and said light radiation means radiates light on the liquid crystal cell in the state in which the light transmittance of the mixture solution is minimum, polymerizes the polymer material, and fixes the domains.

6. The apparatus according to claim 2, wherein said temperature adjusting means lowers the temperature of the mixture solution and forms domains of the liquid crystal in the mixture solution, and said light radiation means radiates light on the mixture solution in which the domains are formed by the lowering of the temperature by means of said temperature adjusting means, progresses phase separation of the mixture solution, grows the domains, polymerizes the polymer material, and fixes the domains.

7. The apparatus according to claim 2, wherein said temperature adjusting means comprises:

non-polymerizing light radiation means for radiating light of a wavelength range, which causes no light polymerization of the polymer material, to the liquid crystal cell containing the mixture solution;

measuring means for measuring the intensity of light which has been emitted from the non-polymerizing light radiation means and has passed through the liquid crystal cell; and control means for starting radiation of light on the liquid crystal cell by said light radiation means in response to a measurement result by said measuring means.

8. The apparatus according to claim 2, wherein said temperature adjusting means comprises at least one of means for setting the temperature of the mixture solution at a temperature slightly lower than a temperature at which phase separation of the mixture solution begins, means for setting the temperature of the mixture solution at a temperature at which the mixture solution is phase-separated substantially completely, and means for setting the temperature of the mixture solution at one of a temperature at which domains of the liquid crystal are formed in the mixture solution and a temperature at which the domains grow.

9. The apparatus according to claim 2, wherein said temperature adjusting means comprises at least one of means for once lowering the temperature of the mixture solution and then keeping the temperature of the mixture solution at a constant value, and means for continuously lowering the temperature of the mixture solution with the passage of time.

10. A method of manufacturing a polymer dispersion type liquid crystal display device, said method comprising:

a step of injecting into a liquid crystal cell a mixture solution of a liquid crystal and a polymer material which is subjected to a polymerization reaction by light;

a temperature adjusting step of lowering the temperature of the mixture solution in the liquid crystal cell and phase-separating the mixture solution; and a light radiation step of radiating light on the liquid crystal cell in the state in which the temperature of the mixture solution is lowered in said temperature adjusting step.

11. The method according to claim 10, wherein said temperature adjusting step includes a step of forming domains of the liquid crystal in the mixture solution by the lowering of the temperature of the mixture solution and a step of growing the formed domains, and said light radiation step includes a step of radiating light on the liquid crystal cell and polymerizing the polymer material in the state in which the surface area of the domains takes a maximum value, and fixing the domains.

12. The method according to claim 10, wherein said temperature adjusting step includes a step of forming domains of the liquid crystal in the mixture solution by the lowering of the temperature of the mixture solution and a step of growing the formed domains, and said light radiation step includes a step of radiating light on the liquid crystal cell and polymerizing the polymer material in the state in which the light scattering ratio of the mixture solution takes a maximum value, and fixing the domains.

13. The method according to claim 10, wherein said temperature adjusting step includes a step of forming domains of the liquid crystal in the mixture solution by the lowering of the temperature of the mixture solution and a step of growing the formed domains, and said light radiation step includes a step of radiating light on the liquid crystal cell and polymerizing the polymer material in the state in which the light transmittance of the mixture solution takes a minimum value, and fixing the domains.

14. The method according to claim 10, wherein said temperature adjusting step includes a step of lowering the temperature of the mixture solution and forming domains of the liquid crystal, and said light radiation step includes a step of radiating light on the mixture solution in which the domains are formed, progressing phase-separation of the mixture solution, and growing the domains, and a step of polymerizing the polymer material and fixing the grown domains.

15. The method according to claim 10, wherein said temperature adjusting step includes at least one of a step of setting the temperature of the mixture solution at a temperature slightly lower than a temperature at which phase separation of the mixture solution begins, a step of setting the temperature of the mixture solution at a temperature at which the mixture solution is phase-separated substantially completely, and a step of setting the temperature of the mixture solution at one of a temperature at which domains of the liquid crystal are formed in the mixture solution and a temperature at which the domains grow.

16. The method according to claim 10, wherein said temperature adjusting step includes at least one of a step of once lowering the temperature of the mixture solution and then keeping the temperature of the mixture solution at a constant value, and a step of continuously lowering the temperature of the mixture solution with the passage of time.

17. The apparatus according to claim 1, wherein the inner surface of said casing has one of a spherical shape, an ellipsoidal shape and a polygonal shape, and light from the light source is radiated on the liquid crystal cell in substantially all directions.

18. An apparatus for manufacturing a polymer dispersion type liquid crystal display device, said apparatus comprising:

support means for supporting a liquid crystal cell filled with a mixture solution of a liquid crystal and a polymer material which is subjected to a polymerization reaction by light;

light radiation means for radiating light of a wavelength range, which causes a polymerization reaction in the polymer material, onto the liquid crystal cell supported by said support means from at least both side faces of the liquid crystal cell, thereby forming a polymer dispersion liquid crystal layer in said liquid crystal cell; and adjusting means for phase-separating the liquid crystal and the polymer material in the mixture solution, wherein said light radiation means radiates light on the liquid crystal cell in the state in which the area of the interface is maximum, and thereby a polymer dispersion liquid crystal layer is formed within the liquid crystal cell.

\* \* \* \* \*